United States Patent
Ikeda et al.

(10) Patent No.: US 8,065,321 B2
(45) Date of Patent: Nov. 22, 2011

(54) APPARATUS AND METHOD OF SEARCHING DOCUMENT DATA

(75) Inventors: Tetsuya Ikeda, Tokyo (JP); Takuya Hiraoka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 785 days.

(21) Appl. No.: 12/138,907

(22) Filed: Jun. 13, 2008

(65) Prior Publication Data

US 2008/0319989 A1 Dec. 25, 2008

(30) Foreign Application Priority Data

Jun. 20, 2007 (JP) ................................. 2007-162446
Jan. 22, 2008 (JP) ................................. 2008-011900

(51) Int. Cl.
G06F 17/30 (2006.01)
(52) U.S. Cl. .................................................. 707/769
(58) Field of Classification Search .................. 707/609, 707/687, 705, 727, 730, 748, 769
See application file for complete search history.

(56) References Cited

U.S. PATENT DOCUMENTS

| 2001/0021922 A1* | 9/2001 | Curtis et al. ............... 705/35 |
| 2006/0018544 A1* | 1/2006 | Ohguro ..................... 382/181 |
| 2006/0230031 A1 | 10/2006 | Ikeda et al. |

FOREIGN PATENT DOCUMENTS

| JP | 2003-281181 | 10/2003 |
| JP | 2004-348591 | 12/2004 |
| JP | 2005-242579 | 9/2005 |

* cited by examiner

*Primary Examiner* — Fred I Ehichioya
(74) *Attorney, Agent, or Firm* — Oblon, Spivak, McClelland, Maier & Neustadt, L.L.P.

(57) ABSTRACT

An apparatus and method of searching an electronic document are disclosed. A document that is assumed to contain a search symbol set is searched. The search symbol set is a symbol set being extracted from a plurality of symbols representing a search request when the symbol set being extracted satisfies a predetermined condition.

14 Claims, 10 Drawing Sheets

FIG. 4

XL/IXLA◎㈱アドイン研究所：ZERO，AI-DNA◎㈱アイザック：K-Prolog，K-Prologコンパイラ，methodlog◎岩崎技研工業㈱：AZ-Prolog，C-Prolog◎㈲インターメディア・アクセス：Astral Prolog◎エーエスアール㈱：EXSYS◎㈱エーエスピー：RT-Prolog◎㈱エヌ・ジェー・ケー：KBMS/NEWS◎オーバーシーズ・ベクトル・インコーポレーテッド：NEXPERTOBJECT◎㈱カテナ・リソース研究所：STAR◎㈱経調：ORBS◎シーアイテクノセールス㈱：IXLA ◎ ㈱ CSK：LucibCommon Lisp◎㈱東洋情報システム：Super-BRAINS/C◎㈱日本カラーデザイン研究所：しんだん君◎日本電子計算㈱：CSRL◎パーソナルメディア㈱：OPS83，83FRAMER◎㈱ビーユージー：OPS5onNEWS◎富士ゼロックス情報システム㈱：Smalltalk-80システムパッケージ

APPARATUS AND METHOD OF SEARCHING DOCUMENT DATA

CROSS-REFERENCE TO RELATED APPLICATIONS

This patent application is based on and claims priority under 35 U.S.C. §119 to Japanese Patent Application Nos. 2007-162446 filed on Jun. 20, 2007, and 2008-011900 filed on Jan. 22, 2008, in the Japanese Patent Office, the entire contents of which are hereby incorporated by reference.

FIELD OF THE INVENTION

Example embodiments of the present invention relate generally to an apparatus, method, system, computer program and product, each capable of searching an electronic document.

BACKGROUND

Recently, the use of electronic data has been increased especially in an office environment. For example, instead of keeping a document in the paper form, the document may be converted to electronic data using an image processing apparatus, and stored in the form of electronic data. In order to retrieve a desired document from a large number of stored documents, a user usually requests an information retrieval system to search through the stored electronic documents. In order to improve the office work efficiency, there is a need for the information retrieval system capable of locating the desired document with less time and with high accuracy.

One technique of retrieving the desired document is to search through the stored documents for one or more documents that matches a keyword input by the user and to provide a list of the documents that matches the keyword, for example, as described in the Japanese Patent Application No. 2004-348591. This text search technique however requires the use of an optical character reader (OCR) as it is necessary to convert information contained in the electronic document to text data. Further, this technique may require the user to additionally provide information regarding the electronic document when storing or searching the electronic document, such as information regarding the language used in the electronic document.

The Japanese Patent Application Publication No. 2003-281181 describes a technique of retrieving the desired document, which does not require the use of OCR or information regarding the language used in the document. To locate the desired document, the technique described in the Japanese Patent Application Publication No. 2003-281181 converts a keyword input by the user to a set of symbols, and searches through the stored documents for one or more electronic documents each having a set of symbols that matches the set of symbols converted from the keyword. This technique may not be practical in terms of the time that may be required for searching, especially when the number of stored documents is large.

SUMMARY

Example embodiments of the present invention include a document retrieval apparatus capable of searching a document. The document retrieval apparatus includes: a storage device to store correspondence information indicating the correspondence between a registered symbol set and a registered document, wherein the registered symbol set is extracted from a plurality of symbols representing the registered document, the plurality of symbols being converted from character image data of at least a portion of the registered document; and a processor to extract a symbol set from a plurality of symbols representing a search request as an extracted symbol set, select the extracted symbol set as a search symbol set when the correspondence information indicates that the extracted symbol set satisfies a predetermined condition, and search a document that is assumed to contain the search symbol set using the correspondence information.

In one example, the predetermined condition may be the condition in which the document frequency of the extracted symbol set obtainable from the correspondence information is within a range defined by a first value and a second value, the second value being greater than the first value. In another example, the predetermined condition may be the condition in which the document frequency obtainable from the correspondence information relative to the total number of documents subjected for searching is within a range defined by a third value and a fourth value, the fourth value being greater than the third value.

Example embodiments of the present invention include a method of searching a document including: storing correspondence information indicating the correspondence between a registered symbol set and a registered document; extracting a symbol set from a plurality of symbols representing a search request as an extracted symbol set; selecting the extracted symbol set as a search symbol set when the correspondence information indicates that the extracted symbol set satisfies a predetermined condition; and searching a document that is assumed to contain the search symbol set using the correspondence information.

Example embodiments of the present invention include a document retrieval apparatus or system capable of searching a document, which may be provided with the functions of: converting character image data of at least a portion of a registered document to a plurality of symbols representing the registered document; extracting a symbol set from the plurality of symbols representing the registered document as a registered symbol set; storing correspondence information indicating the correspondence between the registered symbol set and the registered document; converting character image data of at least a portion of a search request to a plurality of symbols representing the search request; and searching a document that is assumed to contain a selected symbol set using the correspondence information. The selected symbol set may correspond to an extracted symbol set being extracted from the plurality of symbols representing the search request when the correspondence information indicates that the extracted symbol set satisfies a predetermined condition.

Example embodiments of the present invention include a computer readable medium storing computer instructions for performing the method of searching a document. The method includes: storing correspondence information indicating the correspondence between a registered symbol set and a registered document; extracting a symbol set from a plurality of symbols representing a search request as an extracted symbol set; selecting the extracted symbol set as a search symbol set when the correspondence information indicates that the extracted symbol set satisfies a predetermined condition; and searching a document that is assumed to contain the search symbol set using the correspondence information.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4 is an example illustration of character image data of a document to be registered by the document retrieval apparatus 120 shown in FIG. 1;

FIG. 5 is an example illustration of a plurality of circumscribed rectangles extracted from the character image data shown in FIG. 4;

FIG. 6 is an example illustration of a plurality of character lines each including in-line circumscribed rectangles, generated from the plurality of circumscribed rectangles shown in FIG. 5;

Figure 1:
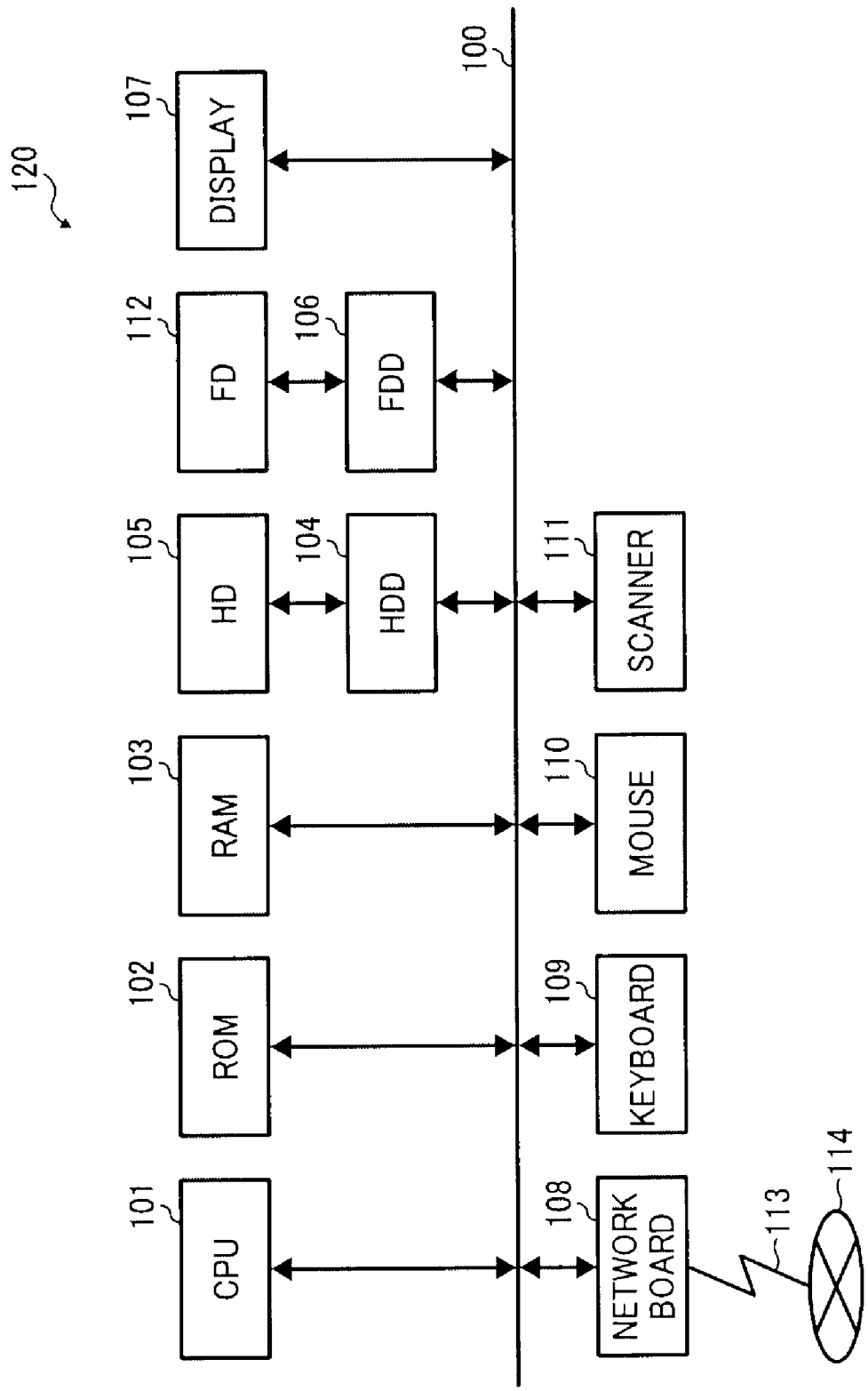
FIG. 1 is a schematic block diagram illustrating the hardware structure of an document retrieval apparatus, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIG. 1, a hardware structure of a document retrieval apparatus 120 is explained according to an example embodiment of the present invention. The document retrieval apparatus 120 includes an central processing unit (CPU) 101, a read only memory (ROM) 102, a random access memory (RAM) 103, a hard disk drive (HDD) 104, a hard disk (HD) 105, a flexible disk drive (FDD) 106, a floppy disk (FD) 112, a display 107, a network board 108, a keyboard 109, a mouse 110, and a scanner 111, which are connected or coupled with one another via a bus 100.

The CPU 101 controls operation of the document retrieval apparatus 120. The ROM 102 stores various kinds of computer program including a program, which causes the document retrieval apparatus 120 to perform operation of registering a document or searching a document. The RAM 103 may function as a work area of the CPU 101, or an area to store various data. In this example, the RAM 103 may be volatile and/or involatile depending on one or more functions to be provided by the RAM 103. The HDD 104 may control operation of reading or writing data from or onto the HD 105 under control of the CPU 101. The HD 105 may store data, which may be written by the HDD 104. The FDD 106 may control operation of reading or writing data from or onto the FD 112 under control of the CPU 101. The FD 112, which is removable, may store data written by the FDD 106.

The display 107 may display various data including, for example, a curser, menu, window, text data or image data. The keyboard 109 may input various data, such as a user instruction provided by a user. The mouse 110 may be used to input various data, such as a user instruction, for example, by moving the curser displayed on the display 107, selecting the menu displayed on the display 107, or opening and/or closing the window displayed on the display 107. The scanner 111 optically reads a document into image data. In this example, the image data may contain information regarding characters or images.

The network board 108 connects the document retrieval apparatus 120 to a network 114 via a communication cable 113. For example, the network board 108 may allow the document retrieval apparatus 120 to function as a server apparatus, which communicates with one or more client apparatus via the network 114. With this network configuration, a user at the client apparatus may request the document retrieval apparatus 120 to search through the documents stored in the document retrieval apparatus 120 for a desired document. In another example, a plurality of document retrieval apparatuses 120 may be connected with one another through the network 113. With this network configuration, a user at one of the document retrieval apparatus 120 may request the document retrieval apparatus 120 to search through the documents stored in any one of the document retrieval apparatuses 120 existed on the network 113 for a desired document. In another example, the document retrieval apparatus 120 may be connected to another device, such as a storage device storing a plurality of documents, through the network 113. With this network configuration, a user at the document retrieval apparatus 120 may request the document retrieval apparatus 120 to search through the documents stored in the storage device for a desired document.

Further, the document retrieval apparatus 120 of FIG. 1 may be implemented in various other ways. For example, the document retrieval apparatus 120 may be implemented by any desired personal computer. In such case, the scanner 111 may be connected locally to the personal computer.

In another example, the document retrieval apparatus 120 may be implemented by a multifunctional apparatus capable of performing a plurality of functions including, for example, scanning, copying, printing, and faxing. In such case, the document retrieval apparatus 120 may be additionally provided with a printer capable of printing image data on a recording medium, or a faxing device capable of transmitting or receiving fax data. Further, in such case, the functions of inputting and outputting, which are performed by the display 107, keyboard 109, and mouse 110, may be preformed by an operation control panel provided with a touch panel screen.

In one example operation, the document retrieval apparatus 120 generates correspondence information, which may be used when searching a document in response to a search request provided by the user. In one example, correspondence information may be generated based on one or more documents that are searchable by the document retrieval apparatus 120, such as one or more sample documents randomly selected from the documents searchable by the document retrieval apparatus 120 or all documents searchable by the document retrieval apparatus 120. In this example, the registered document may be stored in the document retrieval apparatus 120 such as the HD 105 of the document retrieval apparatus 120. Alternatively, the registered document may be stored in any device outside of the document retrieval apparatus 120. Further, a selected portion, such as a selected paragraph or a character line, of the document may be used to generate correspondence information. For the descriptive purpose, any document that may be used to generate correspondence information may be referred to as a document to be registered ("registered document").

In one example, a user may provide the registered document in the paper form to the scanner 111. The scanner 111 scans the registered document into image data. Alternatively, the registered document may be provided through the network board 108 or the FD 112 in the electronic form. Alternatively, the registered document may be generated by the document retrieval apparatus 120 using a word processing program.

When the registered document is received from the scanner 111, the CPU 101 causes the HDD 104 to store the registered document in the form of image data in the HD 105. At this time, the CPU 101 may store information regarding the registered document, for example, in a memory such as the RAM 103. In this example, the CPU 101 stores correspondence information indicating the correspondence between a registered symbol set representing the registered document and the registered document, which may be used when searching for the desired document.

In another example operation, the document retrieval apparatus 120 searches through a storage device, such as the HD 105, for a desired document according to a search request received through any one of the network board 108, keyboard 109, mouse 110, and scanner 111. In one example, a user may provide a search request in the form of text data, such as by typing one or more keywords using the keyboard 109. In another example, the user may provide, as a search request, one or more pages of a document in the form of recording sheet, and requests the document retrieval apparatus 120 to search for the document that contains the provided pages. Alternatively, one or more pages of a document may be provided in the form of data through the FD 112.

When the user instruction for searching is received, the CPU 101 searches through the storage device for the desired document that matches the user's search request using the correspondence information being stored at the time of registering, and outputs a search result. The search result may correspond to any kind of information regarding a document that is assumed to match the search request. The search result may be output through any one of the network board 108, display 107, and FD 112. The search result may be printed by the printer, if the printer is provided.

Figure 2:
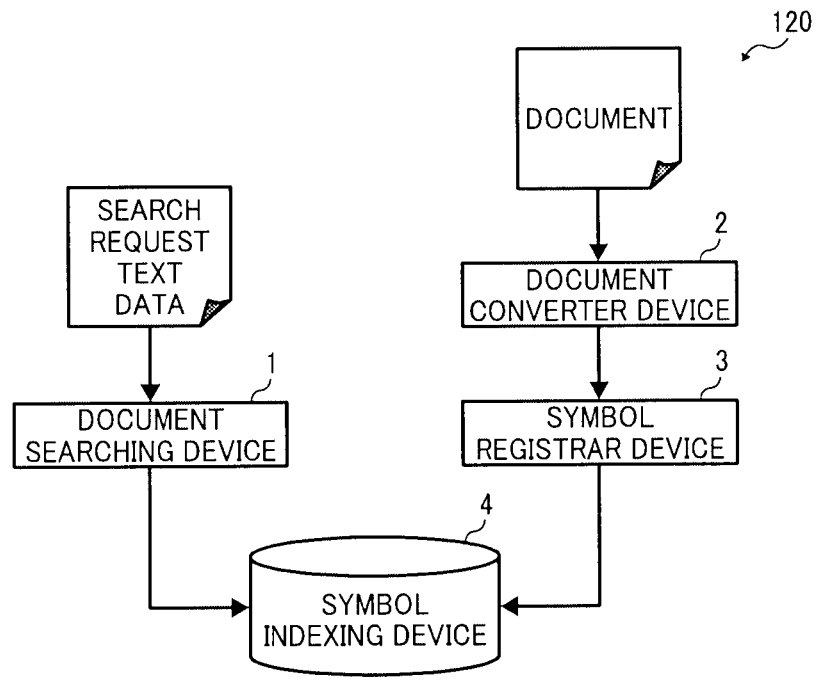
FIG. 2 is a schematic block diagram illustrating the functional structure of the document retrieval apparatus shown in FIG. 1, according to an example embodiment of the present invention.

Referring now to FIG. 2, a functional structure of the document retrieval apparatus 120 is explained according to an example embodiment of the present invention. The document retrieval apparatus 120 includes a document searching device 1, a document converter device 2, a symbol registrar device 3, and a symbol indexing device 4.

In one example, in response to a user instruction, the document retrieval apparatus 120 stores an electronic document as a registered document. The document converter device 2 converts character image data of at least a portion of the registered document to a plurality of symbols representing the registered document. The symbol registrar device 3 extracts a symbol set from the plurality of symbols representing the registered document, and registers the symbol set being extracted as a registered symbol set. The symbol indexing device 4 stores correspondence information indicating the correspondence between the registered symbol set and the registered document.

In another example, in response to a user instruction, the document retrieval apparatus 120 searches a desired document that matches a search request provided by the user. The document converter device 2 converts character image data of at least a portion of the search request to a plurality of symbols representing the search request. The document searching device 1 searches a document that is assumed to match the search request using the correspondence information stored in the symbol indexing device 4. In this example, the document searching device 1 determines whether the plurality of symbols representing the search request contains a symbol set that is useful for finding the desired document. In order to select a symbol set that is useful for finding the desired document, the document searching device 1 extracts a symbol set from the plurality of symbols representing the search request as an extracted symbol set, and determines whether the extracted symbol set satisfies a predetermined condition. When the extracted symbol set satisfies the predetermined condition, the document searching device 1 selects the extracted symbol set as a search symbol set to be used for searching, and searches a document that is assumed to contain the search symbol set.

Figure 3:
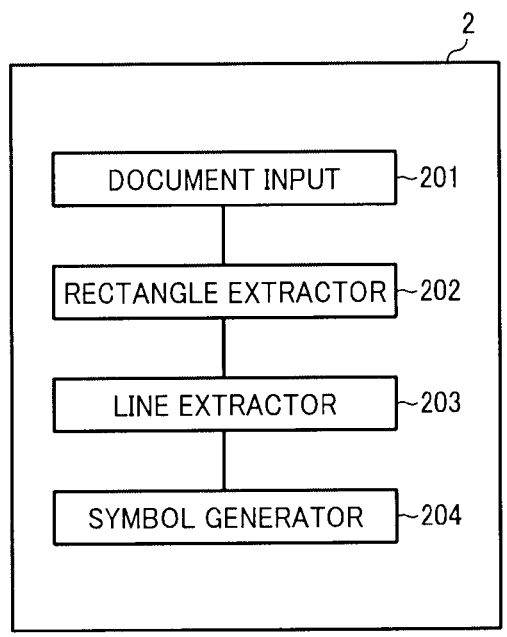
FIG. 3 is a schematic block diagram illustrating the structure of a document converter device shown in FIG. 2, according to an example embodiment of the present invention.

Referring now to FIG. 3, a functional structure of the document converter device 2 is explained according to an example embodiment of the present invention. The document converter device 2 includes a document input 201, a rectangle extractor 202, a line extractor 203, and a symbol generator 204.

The document input 201 receives a document, such as a registered document. In this example, the document retrieval apparatus 120 of FIG. 1 may receive the registered document in the form of electronic data or paper. When the registered document is provided in the form of paper, the scanner 111 of FIG. 1 converts the registered document into image data, and provides the image data to the document input 201. The document input 201 further extracts character image data of at least a portion of the document image data, and provides the character image data to the rectangle extractor 202 for further processing.

The rectangle extractor 202 extracts a plurality of circumscribed rectangles from the character image data. The line extractor 203 forms one or more character lines from the plurality of circumscribed rectangles. The symbol generator 204 converts the plurality of circumscribed rectangles that are grouped into one or more character lines ("in-line circumscribed rectangles") to a plurality of symbols representing the registered document.

Figure 5:
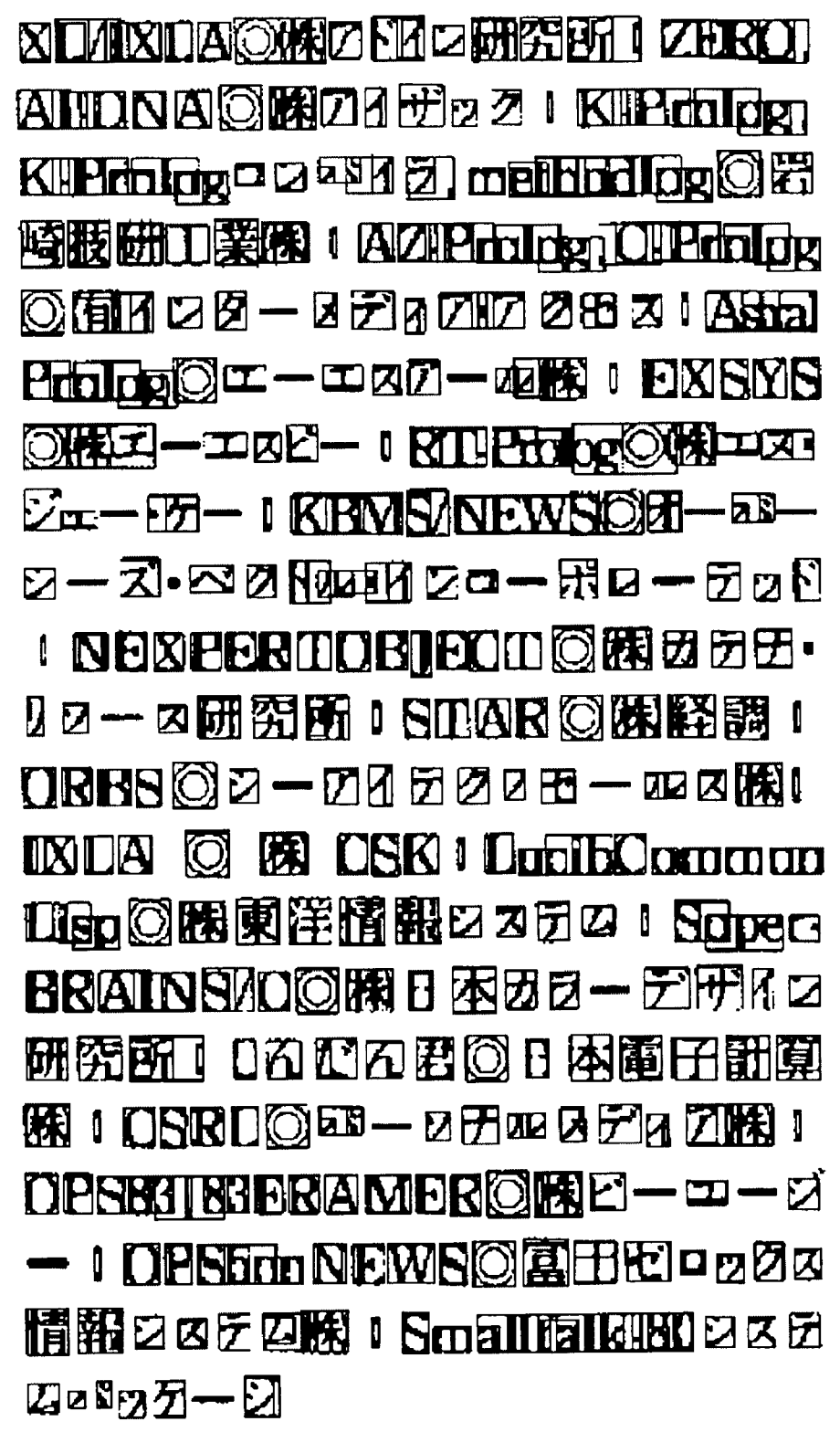

Referring to FIGS. 4, 5, and 6, operation of converting character image data of at least a portion of a registered document to a plurality of symbols is explained according to an example embodiment of the present invention.

The document input 201 receives the registered document, and extracts character image data of at least a portion of the registered document. An example of character image data is shown in FIG. 4. The character image data of FIG. 4 includes Japanese characters and English characters. Alternatively, the character image data may include any character of any language. Further, the character image data may be a compressed image, which has a resolution lower than the resolution of the original document to be registered.

The rectangle extractor 202 extracts a plurality of circumscribed rectangles from the character image data of FIG. 4 using any desired known character recognition method. For example, from the character image data of FIG. 4, the rectangle extractor 202 may extract a run of black pixels and form a plurality of circumscribed rectangles based on the extracted run as shown in FIG. 5.

The line extractor 203 forms one or more character lines from the plurality of circumscribed rectangles of FIG. 5. For example, as illustrated in FIG. 6, the circumscribed rectangles that are located closely are grouped into a character line. The character line may be formed horizontally or vertically, depending on the characteristics of the character image data.

The symbol generator 204 converts the plurality of circumscribed rectangles shown in FIG. 6 to a plurality of symbols. For example, the symbol generator 204 may extract layout information from the plurality of circumscribed rectangles that are grouped into one or more character lines ("in-line circumscribed rectangles"), and generate a series of symbols by quantizing the extracted layout information. Examples of the layout information include, but not limited to, the starting point of the in-line circumscribed rectangle, the size of the in-line circumscribed rectangle such as the height or the width, the density of black pixels in the in-line circumscribed rectangle, and the distance between the in-line circumscribed rectangles adjacent to each other. Any one of the layout information regarding the in-line circumscribed rectangle may be normalized with respect to a character line to which the in-line circumscribed rectangle belongs. For example, the height of the in-line circumscribed rectangle may be normalized with respect to the height of the character line.

Figure 11:
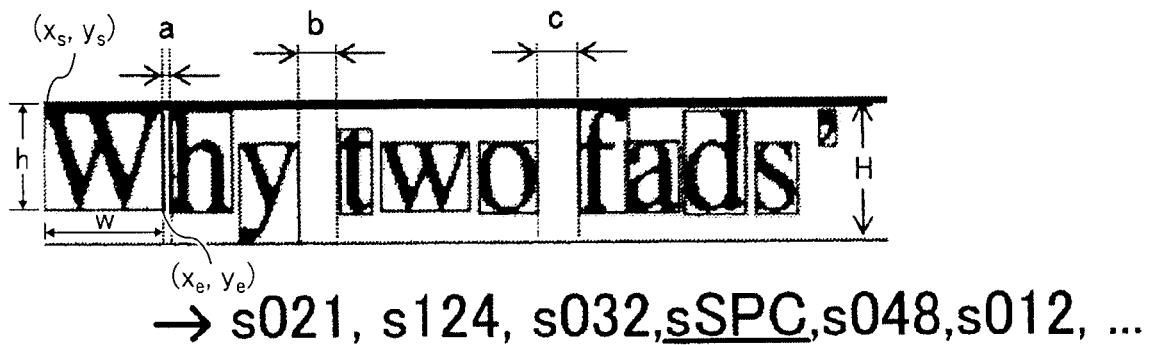
FIG. 11 is an example illustration of a plurality of symbols generated by the document retrieval apparatus shown in FIG. 1.

For example, as illustrated in FIG. 11, in order to convert the in-line circumscribed rectangle representing the character "W" to a symbol s021, any number of parameters, which may correspond to layout information of the in-line circumscribed rectangle, may be obtained, such as the coordinate value (Xs, Ys) of the starting point of the circumscribed rectangle, the coordinate value (Xe, Ye) of the ending point of the circumscribed rectangle, the width w of the circumscribed rectangle, the height h of the circumscribed rectangle, and the density of black pixels in the circumscribed rectangle.

Additionally, any space between the two adjacent words may be converted to a symbol representing the space. Still referring to FIG. 11, a space "b" between the two adjacent words "Why" and "two" may be converted to a symbol sSPC. In order to convert the space "b" to the symbol sSPC, the distance between the adjacent circumscribed rectangles relative to the height H of the character line, which may be expressed as b/H, may be obtained as a parameter of layout information. Further, the space "b" may be converted to the symbol sSPC only when the value of the distance "b" is larger than a reference value. In this manner, a space between the characters, such as a space "a" between the characters "W" and "h" can be prevented from being converted to the symbol.

Once one or more parameters are obtained, each parameter representing the layout information may be expressed as vector data in one dimension on a multidimensional vector space. Using the known vector quantization method, a large set of vector data may be encoded into a small set of vector data representing the large set of vector data. The small set of vector data is labeled to generate a series of symbols, which is one-dimensional data. For example, when three-dimensional vector data representing the layout information of the in-line circumscribed rectangle is obtained, the three-dimensional vector data may be encoded into a discrete number of prototype vectors using a codebook. In this example, the codebook contains information regarding 240 types of prototype vectors, which includes the value of each prototype vector and an identification (ID) number s001 to s240 to be assigned to each prototype vector. The codebook may additionally contain information regarding a prototype vector corresponding to the space. Referring back to FIG. 11, the plurality of in-line circumscribed rectangles representing the phrase "Why two fads" may be converted to a series of symbols s021, s124, s032, sSPC, etc.

After the plurality of symbols representing the registered document is generated by the document converter device 2, the symbol registrar device 3 extracts a symbol set from the plurality of symbols, and registers the extracted symbol set as a registered symbol set in the symbol indexing device 4. As the plurality of symbols representing the registered document does not provide information regarding a class or a type of the word contained in the registered document, which may be useful to group the symbols into a word, the symbol registrar device 3 registers all symbol sets that can be extracted from the plurality of symbols.

Figure 7:
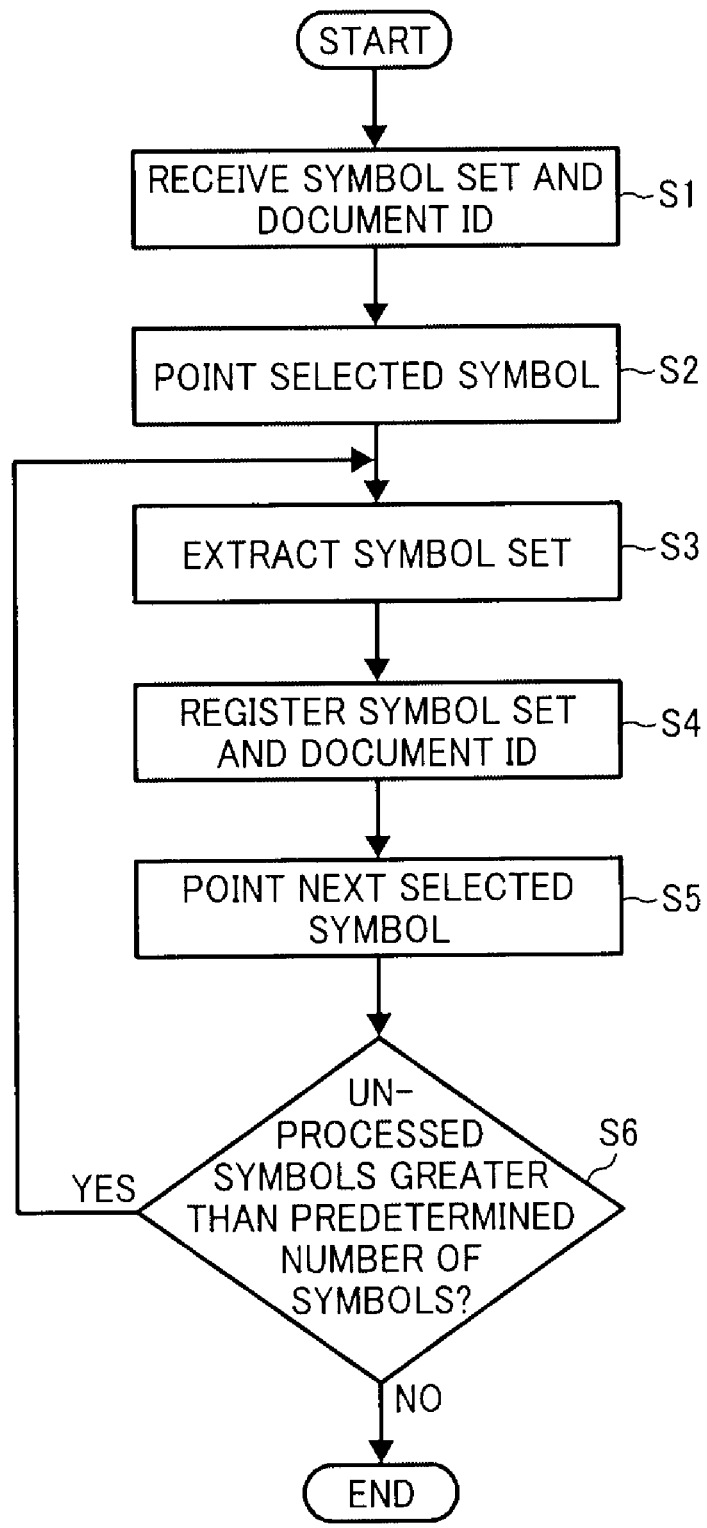
FIG. 7 is a flowchart illustrating operation of registering a symbol set, performed by the document retrieval apparatus of FIG. 1, according to an example embodiment of the present invention.

Referring now to FIG. 7, operation of registering a symbol set, performed by the symbol registrar device 3, is explained according to an example embodiment of the present invention.

S1 receives, from the document converter device 2, the plurality of symbol sets representing the registered document and identification information regarding the registered document. For the descriptive purpose, identification information regarding the registered document may be referred to as a document ID. In this example, the plurality of symbol sets and the document ID, which may be both expressed as numerical data, are provided as a pair.

S2 causes a pointer to point a selected symbol of the plurality of symbols representing the registered document, such as the symbol located at the upper left corner of the character image data.

S3 extracts a symbol set including a predetermined number of symbols. For example, the symbol registrar device 3 may count the number of symbols from the selected symbol, and determines whether the counted number reaches the predetermined number. When it is determined that the counted number reaches the predetermined number, the symbol registrar device 3 extracts the symbol set including the predetermined number of symbols.

S4 registers a pair of the extracted symbol set and the document ID in the symbol indexing device 4.

S5 causes the pointer to point a next selected symbol.

S6 determines whether a number of symbols not processed is greater than the predetermined number of symbols to be included as one symbol set. When S6 determines that the number of symbols not processed is greater than the predetermined number ("YES" at S6), the operation returns to S3. When S6 determines that the number of symbols not processed is equal to or less than the predetermined number ("NO" at S6), the operation ends. Alternatively, S6 may determine whether a number of symbols not processed is equal to or greater than the predetermined number of symbols to be included as one symbol set.

By repeating the operation of FIG. 7 for each registered document, the correspondence information indicating the correspondence between the registered symbol set and the registered document may be stored in the symbol indexing device 4 for all registered documents. In this example, the symbol indexing device 4 may be implemented by an inverted indexing file, which stores, for each registered symbol set, a list of the registered documents each containing at least one of the given registered symbol set.

Figure 8A:
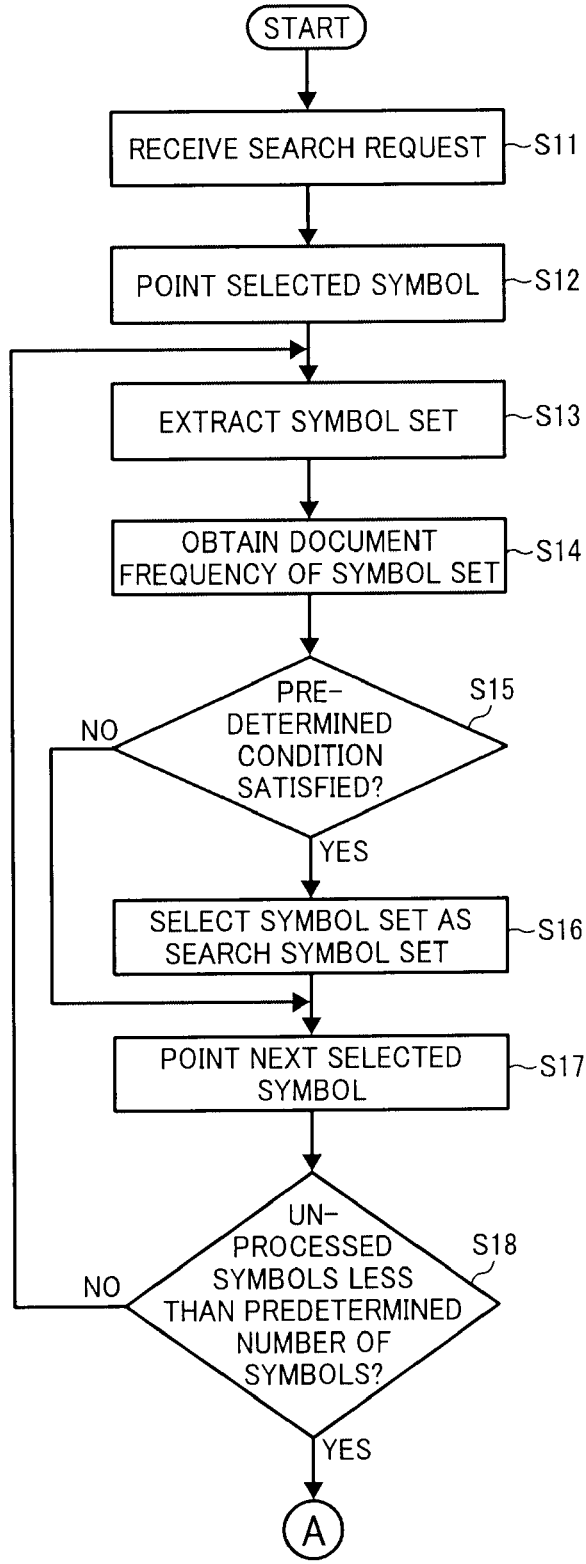
FIGS. 8A and 8B are a flowchart illustrating operation of searching a document that matches a search request, performed by the document retrieval apparatus of FIG. 1, according to an example embodiment of the present invention.
Figure 8B:
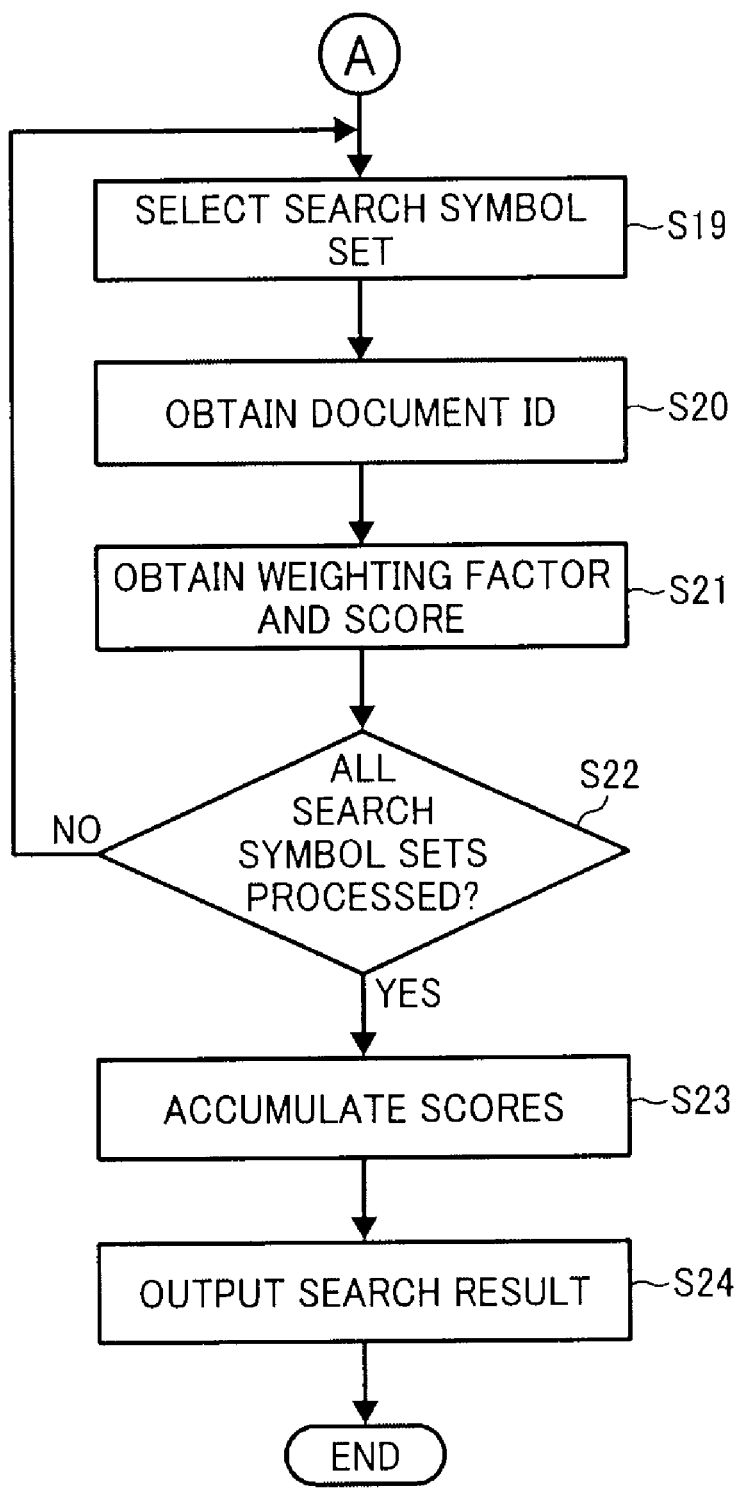

Referring now to FIGS. 8A and 8B, operation of searching a desired document, performed by the document searching device 1 of FIG. 2, is explained according to an example embodiment of the present invention.

Referring to FIG. 8A, S11 receives a plurality of symbols representing a search request. In one example, the search request may be input in the form of text data through any one of the network board 108, keyboard 109, mouse 110, and FD 112 of FIG. 1. The search request, which may include one or more keywords, one or more sentences, etc., is converted from the text data to character image data, for example, using font data, which may be stored in the RAM 103 of FIG. 1. The character image data of the search request is further converted to a plurality of symbols by the document converter device 2 of FIG. 2 in a substantially similar manner as described above referring to FIGS. 3 to 6.

S12 causes a pointer to point a selected symbol of the plurality of symbols representing the search request, such as the symbol located at the upper left corner of the character image data.

S13 extracts a symbol set including a predetermined number of symbols as an extracted symbol set. For example, the document searching device 1 may count the number of symbols from the selected symbol to determine whether the counted number reaches the predetermined number. When the counted number reaches the predetermined number, the document searching device 1 extracts the symbol set including the predetermined number of symbols.

S14 obtains the document frequency of the extracted symbol set by accessing the correspondence information stored in the symbol indexing device 4. Since the symbol indexing device 4 lists one or more documents each containing at least one of the registered symbol set, the document frequency of the extracted symbol set, which is the number of documents each assumed to contain at least one of the registered symbol set that matches the extracted symbol set, may be easily obtained.

S15 determines whether the document frequency of the extracted symbol set satisfies a predetermined condition. For example, the predetermined condition may be set so as to eliminate a symbol set representing a word that is not appropriate for searching.

In one example, a high frequency word that tends to occur in a large number of registered documents may be eliminated, as the high frequency word is too common that it may not be useful to search a desired document out of a large number of documents subjected for searching. Examples of high frequency words include, but not limited to, "the", "a", "an", "and", and "or", each of which may occur in almost all documents but have no relevancy to the content of the document.

Another examples of high frequency words include, but not limited to, the term "computer" in which all registered documents are about computers, which have a strong relationship to the content of the document but not useful in finding a desired document.

In another example, an infrequent word that tends to rarely occur even in a small number of registered documents may be eliminated, as the infrequent word may be too specialized such that it may be not useful for obtaining a reasonable number of desired documents. Further, the infrequent word may correspond to a symbol set representing the word that gives no meaning such as a word having a typographical error or a symbol set that is not accurately converted from the original word.

As the high frequency word and/or the infrequent word may be distinguished from a word that is appropriate for searching based on the document frequency, the document frequency of the extracted symbol set may be used in this example to select a search symbol set. In this manner, searching may be performed more efficiently even when a large number of documents are subjected for searching. More specifically, in this example, the document searching device 1 may determine whether the document frequency of the extracted symbol set, obtainable from the symbol indexing device 4, falls within a range between an upper value and a lower value. The upper value may be set using the correspondence information of the symbol indexing device 4 or set as a default value, so as to eliminate the high frequency word. The lower value may be set using the correspondence information of the symbol indexing device 4 or set as a default value, so as to eliminate the infrequent word.

Referring back to FIG. 8A, when S15 determines that the document frequency of the extracted symbol set satisfies a predetermined condition ("YES" at S15), the operation proceeds to S16. When S15 determines that the document frequency of the extracted symbol set does not satisfy a predetermined condition ("NO" at S15), the operation proceeds to S17.

S16 selects the extracted symbol set as a search symbol set, and stores the search symbol set to be used for searching. For example, the search symbol set may be stored in the RAM 103 of FIG. 1.

S17 causes the pointer to point a next selected symbol.

S18 determines whether a number of symbols not processed is less than the predetermined number of symbols to be included as one symbol set. When S18 determines that the number of symbols not processed is less than the predetermined number ("YES" at S18), the operation proceeds to S19 of FIG. 8B. When S18 determines that the number of symbols not processed is equal to or greater than the predetermined number ("NO" at S18), the operation returns to S13. Alternatively, S18 may determine whether the number of symbols not processed is equal to or less than the predetermined number of symbols to be included as one symbol set.

Referring to FIG. 8B, S19 extracts one of the search symbol sets, which may be stored at S16.

S20 obtains a list of document IDs of one or more documents each assumed to contain the search symbol set, from the symbol indexing device 4.

S21 obtains a weighting factor of the search symbol set, calculates a score for each one of the documents each assumed to contain the search symbol set using the weighting factor, and stores the score for each document with respect to the search symbol set. For example, as described in the Japanese Patent Application Publication No. 2003-281181, the entire of which is hereby incorporated by reference, the weighting factor of the search symbol set and the score of each document assumed to contain the search symbol set may be calculated using the following equations:

weighting factor=log(k1*N/n+k2), wherein k1 and k2 being parameters, N being the total number of documents subjected for searching, and n being the document frequency of the search symbol set; and score=weighting factor*tf/(k0+tf), wherein tf being the frequency of the search symbol set contained within one document, and k0 being a parameter.

Alternatively, any known method of obtaining a weighting factor of the search symbol set or a score of the document that is assumed to contain the search symbol set may be used.

S22 determines whether S20 and S21 are performed on all of the search symbol sets that are selected and stored. When S22 determines that all search symbol sets are processed ("YES" at S22), the operation proceeds to S23. When S22 determines that all search symbol sets are not processed ("NO" at S22), the operation returns to S19.

S23 accumulates, for each document, the scores obtained at S21 with respect to each search symbol set to obtain an accumulated score for each document with respect to all search symbol sets.

S24 returns the document ID in an order from the document having the greatest value of the accumulated score to the document having the least value of the accumulated score, and the operation ends. The list of document IDs, which is ranked by the accumulated score, may be output, for example, to the display 107 of FIG. 1 as a search result.

The operation of FIGS. 8A and 8B may be performed in various other ways. For example, the predetermined condition used by the document searching device 1 may be set differently. For example, the predetermined condition may be set relative to the total number of documents subjected for searching. In such case, S15 of FIG. 8A may determine whether the document frequency relative to the total number of documents subjected for searching, which may be expressed as the equation n/N, falls within a range between an upper value and a lower value. For example, when it can be estimated that the error rate in converting from the character image data to the symbols is 0.01%, the lower value may be set to 0.01. The error rate may be obtained empirically, or it may be determined based on various characteristics such as the scanner capability or the type of the registered documents.

Figure 12:
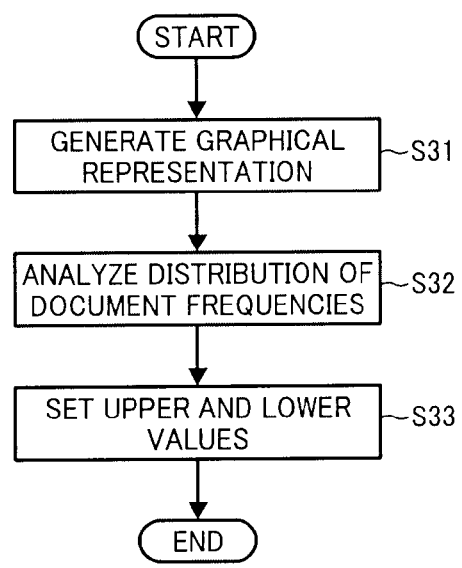
FIG. 12 is a flowchart illustrating operation of setting a predetermined condition, performed by the document retrieval apparatus of FIG. 1, according to an example embodiment of the present invention.

Referring now to FIG. 12, operation of setting the upper value and the lower value of the predetermined condition, performed by the document searching device 1, is explained according to an example embodiment of the present invention.

S31 generates graphical representation, from the correspondence information, which shows a distribution of document frequencies of the plurality of registered symbol sets. In one example, the document searching device 1 may generate a histogram shown in FIG. 9. The histogram of FIG. 9 shows the document frequency range bins on a horizontal axis, and a distinct number of registered symbol sets in a given document frequency range bin on a vertical axis.

S32 of FIG. 12 analyzes the distribution of document frequencies of the plurality of registered symbol sets to generate an analysis result.

S33 sets the upper value and the lower value each based on the analysis result, and the operation ends.

Figure 9:
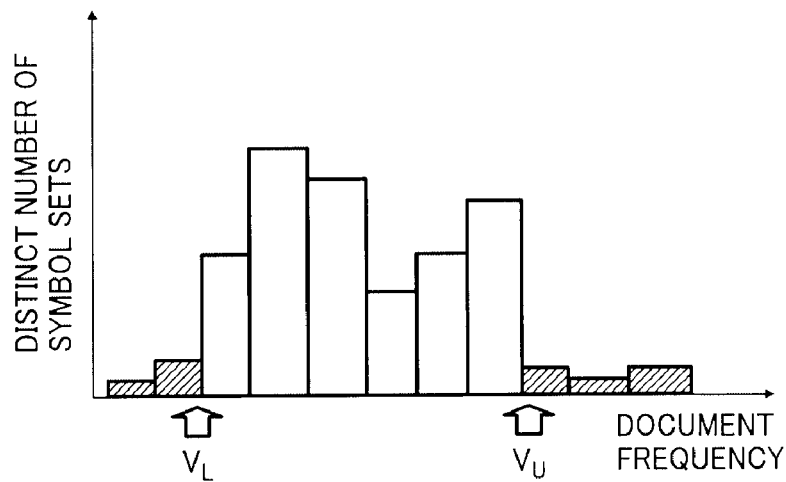
FIG. 9 is an example illustration of a histogram generated by the document retrieval apparatus of FIG. 1, according to an example embodiment of the present invention.

Referring to FIG. 9, in one example, the upper value VU may be set equal to a document frequency value of the document frequency range bin in which the rate of decrease in the distinct number of symbol sets is determined to be relatively high. The lower value VL may be set equal to a document frequency value of the document frequency range bin in which the rate of increase in the distinct number of symbol sets is determined to be relatively high.

More specifically, in this example shown in FIG. 9, the heights of the bars are compared to determine whether there is any point in which the height of the bar changes. When there is the point in which the height of the bar greatly increases, for example, by twice or greater, the corresponding document frequency range bin is selected to obtain a document frequency value to be used as the lower value VL. When there is the point in which the height of the bar greatly decreases, for example, by twice or greater, the corresponding document frequency range bin is selected to obtain a document frequency value to be used as the upper value VU. In this manner, the upper value and the lower value may be easily obtained. In this example, the upper value and the lower value are each obtained. Alternatively, at least one of the upper value and the lower value may be obtained.

Further, once the document retrieval apparatus 120 obtains the upper value or the lower value from the correspondence information, the upper value or the lower value being obtained may be used by any other document retrieval apparatus as long as the registered document is capable of reflecting the characteristics of the documents to be searched. In such case, the document retrieval apparatus provided with the upper value or lower value may be able to search a large number of documents using a search symbol set, without the need of generating or storing the correspondence information or without the need of obtaining the upper value or the lower value.

Figure 10:
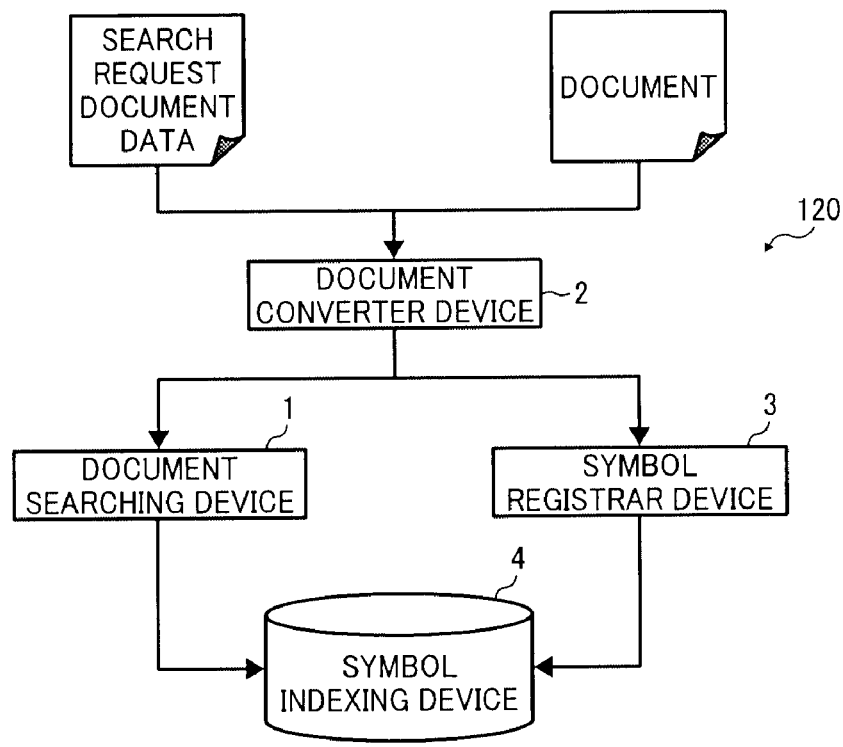
FIG. 10 is a schematic block diagram illustrating the functional structure of the document retrieval apparatus shown in FIG. 1 according to an example embodiment of the present invention.

Referring now to FIG. 10, a functional structure of the document retrieval apparatus 120 is explained according to an example embodiment of the present invention. The document retrieval apparatus 120 of FIG. 10 is substantially similar to the document retrieval apparatus 120 of FIG. 2. The differences include the additional function of converting a search request, which is provided in the form of a recording sheet, to an electronic form.

For example, a user may provide one or more pages of a document to the scanner 111 of FIG. 1. The user may further instruct the document retrieval apparatus 120 to find the document containing one or more pages provided by the user, or any document having the content similar to the content of provided pages. Upon receiving the user instruction, the scanner 111 converts a portion or the entire of one or more pages of the document to an electronic document. The document converter device 2 converts at least a portion of character image data extracted from the electric document to a plurality of symbols representing the search request.

In this manner, the user does not have to input or even think of any keyword to find a desired document. Further, such function of the document retrieval apparatus 120 may be utilized for document management. For example, the user may only keep one page of the document, such as an abstract page of the document, to indicate a collection of the documents being stored. When there is a need for the user to obtain all pages of the stored document, the user may simply provide the page, which is kept at the user side, to the document retrieval apparatus 120.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs such as CD-ROM, CD-R, CD-RW, DVD-ROM, DVD-RAM, DVD–RW, DVD+RW, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

What is claimed is:

1. A document retrieval apparatus, comprising:
    a storage device configured to store correspondence information indicating the correspondence between a registered symbol set and a registered document, wherein the registered symbol set is extracted from a plurality of symbols representing the registered document, the plurality of symbols being converted from character image data of at least a portion of the registered document; and
    a processor configured to extract a symbol set from a plurality of symbols representing a search request as an extracted symbol set, select the extracted symbol set as a search symbol set when the correspondence information indicates that the extracted symbol set satisfies a predetermined condition, and search a document that is assumed to contain the search symbol set using the correspondence information,
    wherein the predetermined condition is the condition in which a document frequency of the extracted symbol set obtainable from the correspondence information is within a range defined by a first value and a second value, the second value being greater than the first value, and
    wherein the processor is further configured to generate, from the correspondence information, graphical representation showing a distribution of document frequencies of the registered symbol set, and analyze the distribution of document frequencies of the registered symbol set to generate an analysis result, wherein at least one of the first value and the second value is set based on the analysis result.

2. The apparatus of claim 1, wherein the predetermined condition is the condition in which the document frequency of the extracted symbol set obtainable from the correspondence information relative to the total number of documents subjected for searching is within a range defined by a third value and a fourth value, the fourth value being greater than the third value.

3. The apparatus of claim 1, wherein the graphical representation is a histogram having a first axis representing a document frequency range and a second axis representing a distinct number of the registered symbol set in the document frequency range.

4. The apparatus of claim 3, wherein at least one of the first value and the second value corresponds to a document frequency value of the document frequency range in which the rate of change in the distinct number of the registered symbol is determined to be relatively high.

5. The apparatus of claim 1, further comprising:
    an input device configured to input the search request in the form of text data, wherein the processor is configured to convert at least a portion of the search request to character image data representing the search request, and further convert the character image data representing the search request to the plurality of symbols representing the search request.

6. The apparatus of claim 1, further comprising:
    a scanner device configured to receive a document containing the search request in the form of recording sheet, and convert the document containing the search request to an electronic document containing the search request,
    wherein the processor is configured to convert at least a portion of the electronic document containing the search request to character image data representing the search request, and further convert the character image data representing the search request to the plurality of symbols representing the search request.

7. A method of searching a document, the method comprising:
    storing correspondence information indicating the correspondence between a registered symbol set and a registered document;
    extracting a symbol set from a plurality of symbols representing a search request as an extracted symbol set;
    selecting the extracted symbol set as a search symbol set when the correspondence information indicates that the extracted symbol set satisfies a predetermined condition; and
    searching a document that is assumed to contain the search symbol set using the correspondence information,
    wherein the predetermined condition is the condition in which a document frequency of the extracted symbol set obtainable from the correspondence information is within a range defined by a first value and a second value, the second value being greater than the first value, and
    wherein the selecting the extracted symbol set as a search symbol set comprises:
        generating, from the correspondence information, graphical representation showing a distribution of document frequencies of the registered symbol set;
        analyzing the distribution of document frequencies of the registered symbol set to generate an analysis result; and
        setting at least one of the first value and the second value based on the analysis result.

8. The method of claim 7, wherein the predetermined condition is the condition in which the document frequency of the extracted symbol set obtainable from the correspondence information relative to the total number of documents subjected for searching is within a range defined by a third value and a fourth value, the fourth value being greater than the third value.

9. The method of claim 7, further comprising:
    inputting the search request in the form of text data; converting at least a portion of the search request to character image data representing the search request; and
    converting the character image data representing the search request to the plurality of symbols representing the search request.

10. The method of claim 7, further comprising:
receiving a document containing the search request in the form of recording sheet;
converting the document containing the search request to an electronic document containing the search request;
converting at least a portion of the electronic document containing the search request to character image data representing the search request; and
converting the character image data representing the search request to the plurality of symbols representing the search request.

11. A document retrieval apparatus, comprising:
means for converting character image data of at least a portion of a registered document to a plurality of symbols representing the registered document;
means for extracting a symbol set from the plurality of symbols representing the registered document as a registered symbol set;
means for storing correspondence information indicating the correspondence between the registered symbol set and the registered document;
means for converting character image data of at least a portion of a search request to a plurality of symbols representing the search request;
means for selecting an extracted symbol set being extracted from the plurality of symbols representing the search request as a search symbol set when the correspondence information indicates that the extracted symbol set satisfies a predetermined condition, and searching a document that is assumed to contain the selected symbol set using the correspondence information,
wherein the predetermined condition is the condition in which a document frequency of the extracted symbol set obtainable from the correspondence information is within a range defined by a first value and a second value, the second value being greater than the first value, and
wherein the means for selecting an extracted symbol set being extracted from the plurality of symbols representing the search request comprises:
means for generating, from the correspondence information, graphical representation showing a distribution of document frequencies of the registered symbol set;
means for analyzing the distribution of document frequencies of the registered symbol set to generate an analysis result; and
means for setting at least one of the first value and the second value based on the analysis result.

12. The apparatus of claim 11, wherein the predetermined condition is the condition in which the document frequency of the extracted symbol set obtainable from the correspondence information relative to the total number of documents subjected for searching is within a range defined by a third value and a fourth value, the fourth value being greater than the third value.

13. The apparatus of claim 11, further comprising:
means for inputting the search request in the form of text data,
wherein the means for converting character image data of at least a portion of a search request to a plurality of symbols representing the search request is configured to convert at least a portion of the search request to character image data representing the search request, and further convert the character image data representing the search request to the plurality of symbols representing the search request.

14. The apparatus of claim 11, further comprising:
means for receiving a document containing the search request in the form of recording sheet, and converting the document containing the search request to an electronic document containing the search request,
wherein the means for converting character image data of at least a portion of a search request to a plurality of symbols representing the search request is configured to convert at least a portion of the electronic document containing the search request to character image data representing the search request, and further convert the character image data representing the search request to the plurality of symbols representing the search request.

* * * * *